(12) United States Patent
Abraham

(10) Patent No.: US 9,729,084 B2
(45) Date of Patent: Aug. 8, 2017

(54) WIDE POWER RANGE RESONANT CONVERTER

(71) Applicant: ANALOGIC CORPORATION, Peabody, MA (US)

(72) Inventor: Doug Q. Abraham, Topsfield, MA (US)

(73) Assignee: ANALOGIC CORPORATION, Peabody, MA (US)

( * ) Notice: Subject to any disclaimer, the term of this patent is extended or adjusted under 35 U.S.C. 154(b) by 52 days.

(21) Appl. No.: 14/765,428

(22) PCT Filed: Feb. 1, 2013

(86) PCT No.: PCT/US2013/024409
§ 371 (c)(1),
(2) Date: Aug. 3, 2015

(87) PCT Pub. No.: WO2014/120242
PCT Pub. Date: Aug. 7, 2014

(65) Prior Publication Data
US 2016/0013735 A1    Jan. 14, 2016

(51) Int. Cl.
*H02M 1/08* (2006.01)
*H02M 7/537* (2006.01)
*H02M 7/5387* (2007.01)
*H02M 7/48* (2007.01)

(52) U.S. Cl.
CPC ....... *H02M 7/5387* (2013.01); *H02M 7/4807* (2013.01); *H02M 2007/4815* (2013.01); *H02M 2007/53878* (2013.01); *Y02B 70/1441* (2013.01)

(58) Field of Classification Search
CPC ..... H02M 1/08; H02M 7/537; H02M 7/53871
USPC ............................................. 363/95, 97, 98
See application file for complete search history.

(56) References Cited

U.S. PATENT DOCUMENTS

| | | | | |
|---|---|---|---|---|
| 5,875,103 | A * | 2/1999 | Bhagwat | H02M 3/3376 363/17 |
| 6,259,615 | B1 * | 7/2001 | Lin | H02M 7/523 315/225 |
| 8,879,279 | B2 * | 11/2014 | Luo | H02M 3/33507 363/21.02 |
| 2004/0160794 | A1 * | 8/2004 | Lin | H02M 7/523 363/98 |
| 2011/0222651 | A1 | 9/2011 | Ogawa et al. | |
| 2013/0293008 | A1 * | 11/2013 | Quigley | H02M 7/44 307/11 |

(Continued)

OTHER PUBLICATIONS

International Search Report cited in related application No. PCT/US13/24409 dated Feb. 12, 2013, pp. 19.

(Continued)

*Primary Examiner* — Jeffrey Sterrett
(74) *Attorney, Agent, or Firm* — Cooper Legal Group, LLC

(57) ABSTRACT

A resonant power converter. An embodiment with a full-bridge converter is disclosed, controlled with feedback or feedforward technique. Switching schemes are either based on a sort of look up table or on measurement of current or voltage. Dead time may be adjusted. Timing may be such, that in the respective diagonal pairs of the converter, one switch is switched on for a different time (different pulse width) than the other. Use in a relative high power environment for about 20 KW in e.g. an X-Ray or Computer Tompgrapy System.

26 Claims, 6 Drawing Sheets

(56) References Cited

U.S. PATENT DOCUMENTS

| | | | |
|---|---|---|---|
| 2013/0314949 A1* | 11/2013 | Chi | H02M 1/32 363/17 |
| 2014/0376275 A1* | 12/2014 | Ohashi | H02M 1/38 363/21.02 |
| 2016/0013735 A1* | 1/2016 | Abraham | H02M 7/4807 363/132 |

OTHER PUBLICATIONS

Mohan N: "Power Electronic Circuits: An Overview", Industrial Electronics Society, 1988. I ECON '88. Proceedings. , 14 Annual Conference of, IEEE , Oct. 24, 1988 (Oct. 24, 1988) , pp. 522-527, XP032286495, 001: 10.1109/IECON.1988.665737.

Sabate J A et al: "Design considerations for high-voltage high-power full-bridge zero-voltage-switched PWM converter". Applied Power Electronics Conference and Exposition. 1990. APEC '90. Conference Proceedings 1990 .• Fifth Annual. IEEE. Mar. 11, 1990 (Mar. 11, 1990). pp. 275-284. XP032159197. 001: 10.1109/APEC. 1990.66420.

Junming Zhang et al: A novel zero-current-transition full bridge DC/DC converter•, IEEE Transactions on Power Electronics. vol. 21. No. 2. Mar. 1, 2006 (Mar. 1, 2006). pp. 354-360. XP055089718. ISSN: 0885-8993. DOI: 10.1109/TPEL.2005.869748.

* cited by examiner

WIDE POWER RANGE RESONANT CONVERTER

BACKGROUND

The present application relates to the field of power converters. It finds particular application with power converters for radiation systems or other high power applications (e.g., requiring 20 kW or more of power). However, it also finds application with power converters configured to operate with a full load of less than 20 kW.

Radiation systems (e.g., including radiation imaging systems and radiation scanning systems) such as computed tomography (CT) systems, diffraction CT, single-photon emission computed tomography (SPECT) systems, projection systems, and/or line systems, for example, are utilized to provide information, or images, of interior aspects of an object under examination. Generally, the object is exposed to radiation comprising photons (e.g., such as x-ray photons, gamma ray photons, etc.), and an image(s) is formed based upon the radiation absorbed and/or attenuated by interior aspects of the object, or rather an amount of photons that is able to traverse the object. Typically, highly dense aspects of the object absorb and/or attenuate more radiation than less dense aspects, and thus an aspect having a higher density, such as a bone or metal, for example, may be apparent when surrounded by less dense aspects, such as muscle or clothing.

The energy of the radiation, which affects the ability of the radiation to penetrate and traverse the object, is related to the power supplied to a radiation source of the radiation system. For example, the power required to generate radiation that traverses an infant may be about 15 kW, whereas the power required to generate radiation that traverses an adult may be about 60 kW. Other considerations that may cause power output to the radiation source to vary include, among other things, scan time and/or tube potential. Thus, it may be desirable for power converters of some radiation systems, such as some medical systems, to be able to operate at a wide power range.

SUMMARY

Aspects of the present application address the above matters, and others. According to one aspect, a resonant converter is provided. The resonant converter comprises one or more switching elements and a timing component configured to generate a timing signal for respective switching elements based upon a timing schedule. The timing schedule is devised as a function of at least one of a known impulse response of the resonant converter for one or more specified control parameters, a current measurement of current through the resonant converter, or a voltage measurement of voltage applied to a load to which the resonant converter is coupled.

According to another aspect, a method for power conversion is provided. The method comprises devising a timing schedule for a resonant converter. The timing schedule provides information utilized for switching one or more switching elements of the resonant converter. The timing schedule is devised as a function of at least one of a known impulse response of the resonant converter for one or more specified control parameters, a current measurement of current through the resonant converter, or a voltage measurement of voltage applied to a load to which the resonant converter is coupled.

According to yet another aspect, a resonant converter for a radiation system having a minimum dynamic power range of 25 to 1 and a maximum power output of at least 20 kW is provided. The resonant converter comprises one or more switching elements and a timing component configured to generate a timing signal for respective switching elements based upon a timing schedule. The timing schedule devised as a function of at least one of a known impulse response of the resonant converter for one or more specified control parameters, a current measurement of current through the resonant converter, or a voltage measurement of voltage applied to a load to which the resonant converter is coupled. The resonant converter is operably coupled to the radiation system and is configured to provide power to at least one of a radiation source or a detector array of the radiation system.

Those of ordinary skill in the art may appreciate still other aspects of the present application upon reading and understanding the appended description.

FIGURES

The application is illustrated by way of example and not limitation in the figures of the accompanying drawings, in which like references generally indicate like elements and in which.

DETAILED DESCRIPTION

Figure 1:
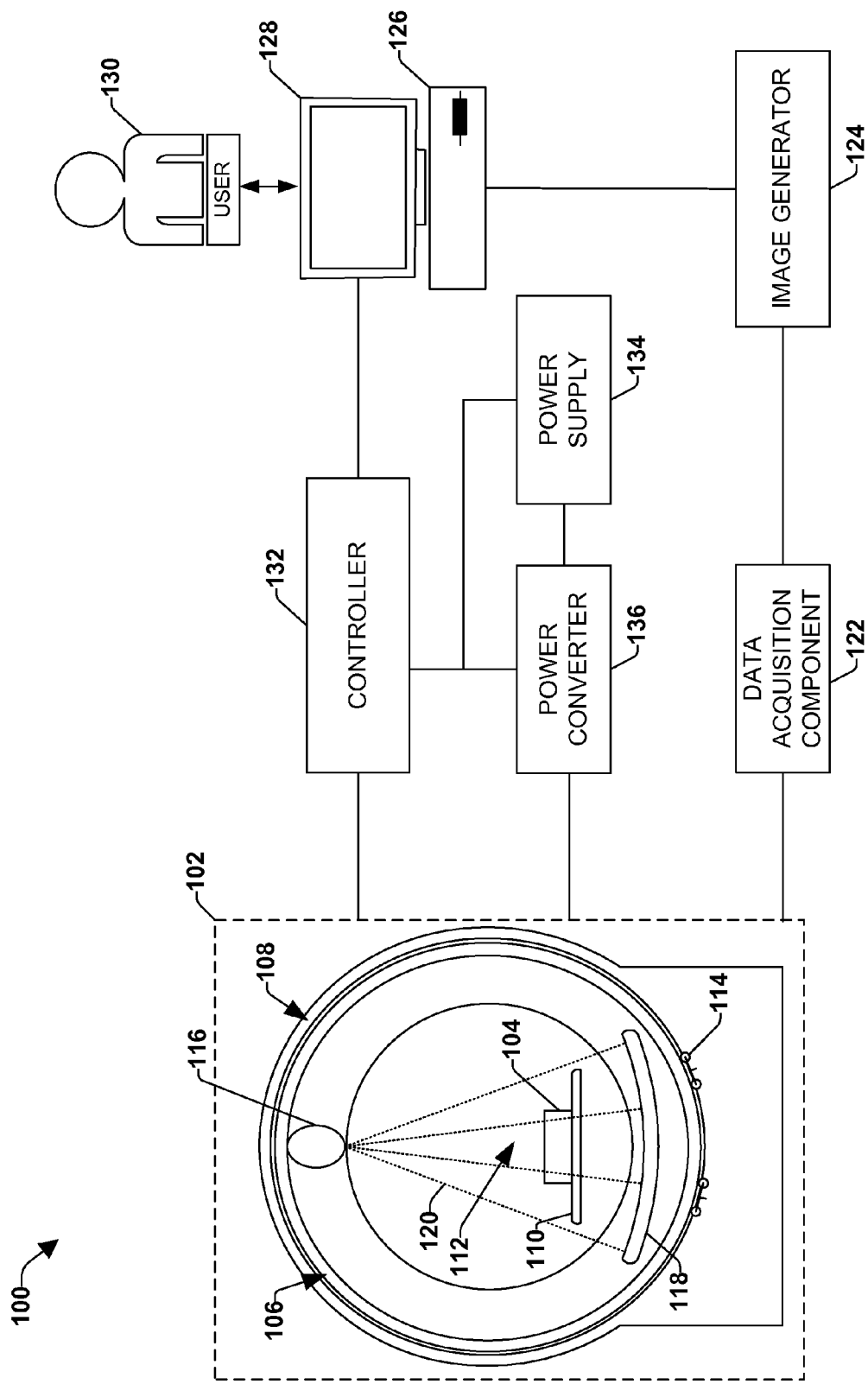
FIG. 1 is a schematic block diagram illustrating an example environment wherein one or more aspects provided herein may be implemented.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

In high power applications, energy losses are an important consideration when designing or selecting a power converter. For example, even one percent loss can have a financial impact (e.g., due to utility cost, maintenance cost, and/or cost associated with cooling the converter). Accordingly, high power applications, including some radiation scanning/imaging applications, have conventionally favored using power converters with a resonant topology (e.g., referred to as resonant converters) because the energy losses of resonant converters are typically less than the energy losses of power converters with a non-resonant topology when operating at full load. However, resonant converters typically do not operate at a mid to low load (e.g., a load that is less than half of the specified full load for the resonant converter). Even if a resonant converter is configured to operate at such loads, the power losses of the resonant converter when operating at a mid to low load often exceed the power losses experienced when the resonant converter is operating at a full load. Accordingly, in applications where a wide range of load conditions is desirable, such as in some CT applications and other radiation system applications, undesirable power losses may be experienced at the lower portion of the load range when using a resonant converter.

As provided for herein, systems and/or techniques for a resonant converter having lower energy losses at a lower portion of a desired load range are provided (e.g., relative to the losses experienced by conventional resonant converters). The systems and/or techniques find particular application in environments where it is desirable for the resonant converter to operate at a wide range of loads. The systems and/or techniques also find application with high power applications (e.g., power applications requiring a load of 20 kW or more), such as with some applications that utilize radiation to image or scan an object.

A timing component is configured to generate timing signals for switches of the resonant converter. The timing component is configured to generate the timing signals as a function of, among other things, a priori knowledge regarding the resonant converter (e.g., such as a known impulse response of the resonant converter given one or more specified control parameters), a current measurement(s) of current through the resonant converter, and/or a voltage measurement of voltage applied to a load via the resonant converter. By way of example, in one embodiment, the timing component is configured to output a timing signal(s) that modifies the pulse shape of signals applied to particular gates of the resonant inverter to reduce or mitigate the possibility of a reverse diode current dropping below zero before switches of the particular gates switch to an on-position (e.g., where increased power losses would occur if the current dropped below zero before the switches were switched to an on-position). That is, stated differently, by modifying the timing of switches, the amount of time that a load current spends in decay mode (e.g., fast decay mode or slow decay mode) can be adjusted.

FIG. 1 illustrates an example environment 100 wherein one or more aspects provided herein may be implemented. More particularly, the example environment 100 illustrates a radiation system (e.g., and in particular a computed tomography (CT) system) having a power converter 136 that includes a resonant topology as provided for herein. It may be appreciated that the example environment 100 merely provides an example arrangement and is not intended to be interpreted in a limiting manner, such as necessarily specifying the location, inclusion, and/or relative position of the components depicted therein. By way of example, the data acquisition component 122 may be part of the detector array 118. Moreover, while the example environment 100 describes the operation of a CT system, the systems and/or techniques described herein may find applicability to other radiation systems (e.g., diffraction CT, single-photon emission computed tomography (SPECT) systems, projection systems, line systems, etc.) and/or other fields unrelated to radiation scanning and/or radiation imaging.

In the example environment 100, an examination unit 102 of the radiation system is configured to examine objects (e.g., bags, suitcases, patients, etc.), such as a first object 104. By way of example, the examination unit 102 may be configured to examine a patient placed on a support gurney and positioned within an examination region 112 of the examination unit 102. In some embodiments, such a radiation system is configured to scan or image objects of varying sizes and shapes. Accordingly, the examination unit 102, and in particular a radiation source 116 of the examination unit 102, may be configured to emit radiation at a wide range of energy spectra, where the particular radiation energy spectrum applied to an object may depend upon the size, shape, and/or profile of the object or portion thereof under examination, for example.

The examination unit 102 can comprise a rotating gantry 106 and a (stationary) support structure 108 (e.g., which may encase and/or surround at least a portion of the rotating gantry 106 (e.g., as illustrated with an outer, stationary ring, surrounding an outside edge of an inner, rotating ring)). The object 104 can be placed on a support article 110 of the examination unit 102, such as a support gurney or conveyor belt, for example, and may be conveyed or translated into the examination region 112 (e.g., a hollow bore in the rotating gantry 106) configured to selectively receive the object 104. The rotating gantry 106 can be rotated about the object 104 during the examination and/or moved relative to the object 104 by a rotator 114, such as a motor, drive shaft, chain, roller truck, etc.

The rotating gantry 106 may surround a portion of the examination region 112 and may comprise the radiation source 116 (e.g., an ionizing radiation source such as an x-ray source or gamma-ray source) and a detector array 118 that is mounted on a substantially diametrically opposite side of the rotating gantry 106 relative to the radiation source 116. In this way, the relative position of the radiation source 116 and the detector array 118 (e.g., the position of the radiation source(s) 116 relative to the detector array 118) may be maintained during an examination of the first object 104 and/or other objects undergoing examination, for example.

During the examination of an object, the radiation source 116 emits fan, cone, wedge, and/or other shaped radiation 120 configurations from a focal spot(s) of the radiation source 116 (e.g., a region within the radiation source 116 from which radiation 120 emanates) into the examination region 112. It may be appreciated that such radiation 120 may be emitted substantially continuously or may be emitted intermittently or periodically (e.g., a brief pulse of radiation is emitted followed by a resting period during which the radiation source 116 is not activated). In some embodiments where the radiation source 116 is rotated about the object during the examination, the energy of radiation emitted by the radiation source 116 may be varied as a function of the profile of the object. For example, lower energy radiation may be emitted when the radiation source 116 is facing a front or back of a patient and higher energy radiation may be emitted when the radiation source 116 is facing a side of the patient (e.g., because human patients are typically thicker from side-to-side than from front-to-back or back-to-front and thus more energy is required for the radiation to traverse the patient when the radiation enters the right side of the patient and exits the left side of the patient relative to the energy required for radiation to traverse the patient from front-to-back, for example).

As the emitted radiation 120 traverses the object 104, the radiation 120 may be attenuated differently by different aspects of the object 104. Because different aspects attenuate different percentages of the radiation 120, an image(s) of the object 104 may be generated based upon the attenuation, or variations in the number of photons that are detected by the detector array 118. For example, more dense aspects of the object 104, such as a bone or metal plate, may attenuate more of the radiation 120 (e.g., causing fewer photons to strike the detector array 118) than less dense aspects, such as skin or clothing.

Radiation detected by the detector array 118 may be directly converted and/or indirectly converted into analog signals that can be transmitted from the detector array 118 to a data acquisition component 122 operably coupled to the detector array 118. The analog signal(s) may carry information indicative of the radiation detected by the detector array 118 (e.g., such as an amount of charge measured over a sampling period and/or an energy level of detected radiation), and the data acquisition component 122 may be configured to convert the analog signals into digital signals and/or to compile signals that were transmitted within a predetermined time interval, or measurement interval, using various techniques (e.g., integration, photon counting, etc.).

In the example environment 100, an image generator 124 (e.g., or image reconstructor) is configured to receive projection data that is output by the data acquisition component 122. Such an image generator 124 may be configured to generate one or more images of an object under examination, such as the first object 104, from the projection data using a suitable analytical, iterative, and/or other image generation technique (e.g., backprojection reconstruction, tomosynthesis reconstruction, iterative reconstruction, etc.). In this way, the data is converted from projection space to image space, a domain that may be more understandable by a user 130 viewing the image(s), for example.

In the example environment, volumetric data indicative of the object 104 may be yielded from the information generated by the detector array 118 due to the rotation of the radiation source 116 and/or detector array 118 about the object 104. Accordingly, the image(s) generated by the image generator 124 may be three-dimensional images (e.g., also referred to as volumetric images), for example. Further, in one embodiment, the image generator 124 may be configured to project the volumetric images to generate two-dimensional images (e.g., also referred to as projections).

The example environment 100 further comprises a terminal 126, or workstation (e.g., a computer), that may be configured to receive images generated by the image generator 124. At least some of the images may be provided by the terminal 126 for display on a monitor 128 to a user 130 (e.g., security personnel, medical personnel, etc.). In this way, the user 130 can inspect the image(s) to identify areas of interest within the object under examination, for example. In other embodiments, no images are generated by the radiation system and instead other information pertaining to the object under examination is conveyed to the terminal 126 and displayed to the user 130 via the display 128. The terminal 126 can also be configured to receive user input which can direct operations of the object examination unit 102 (e.g., a speed to rotate, a speed and direction of a support article 110, etc.), for example. As another example, the terminal 126 can receive information pertaining to the object under examination, such as a portion of the object to be examined, the weight and/or dimensions of the object, and/or orientation of the object, for example.

In the example environment 100, a controller 132 is operably coupled to the terminal 126. The controller 132 may be configured to control operations of the examination unit 102, for example. As an example, the controller 132 may be configured to receive information from the terminal 126 and to issue instructions to the examination unit 102 indicative of the received information (e.g., adjusting a speed of a rotation based upon a request received from the terminal 126).

In some embodiments, the controller 132 may receive a request from the terminal 126 regarding a desired radiation energy level, a desired current to be supplied to the radiation source 116, a desired voltage to be applied to the radiation source 116, and/or a desired power to be supplied to the radiation source 116. In such embodiments, the controller 132 may transmit the request or information related to the request, such as an instruction, to a power supply 134 and/or power converter 136 configured to deliver power to the radiation source 116, for example.

As may be described in more detail below, the power supply 134 is configured to supply a desired amount of power to the radiation system. In some embodiments, the power supply 134 may be a dedicated power supply configured to supply power to merely the radiation source 116 of the radiation system. In other embodiments the power supply 134 may be configured to deliver power to merely auxiliary components of the radiation system, such as the detector array 118 and/or a cooling system of the examination unit 102 (e.g., configured to cool the radiation source 116). In still other embodiments, the power supply 134 may be configured to deliver power to both auxiliary components and the radiation source 116.

The power converter 136 is configured to transform at least some of the power supplied to the radiation system via the power supply 134. For example, the power converter 136 may be configured to at least one of rectify the signal, invert the signal, and/or modify a voltage of the signal. By way of example, in one embodiment, the power supply 134 is configured to output a DC signal and the power converter 136 is configured to invert the DC signal to generate an AC signal that may be better suited for conveying the power between the support structure 108 and the rotating gantry 106 (e.g., via a series of windings), for example. As may be described in more detail below, the particular properties of the AC signal may be specified/controlled based at least in part upon one or more control parameters, which may be received from the controller 132. By way of example, the controller 132 may transmit to the power converter 136 a first set of control parameters to be used when the first object 104 or a first aspect of the first object 104 is being examination and may transmit to the power converter 136 a second set of control parameters to be used when a second object or a second aspect of the first object 104 is being examined. In this way, the controller 132 may provide control parameters to the power converter 136 that alter the power output therefrom (e.g., which may affect the energy spectrum of radiation emitted from the radiation source 116).

Figure 2:
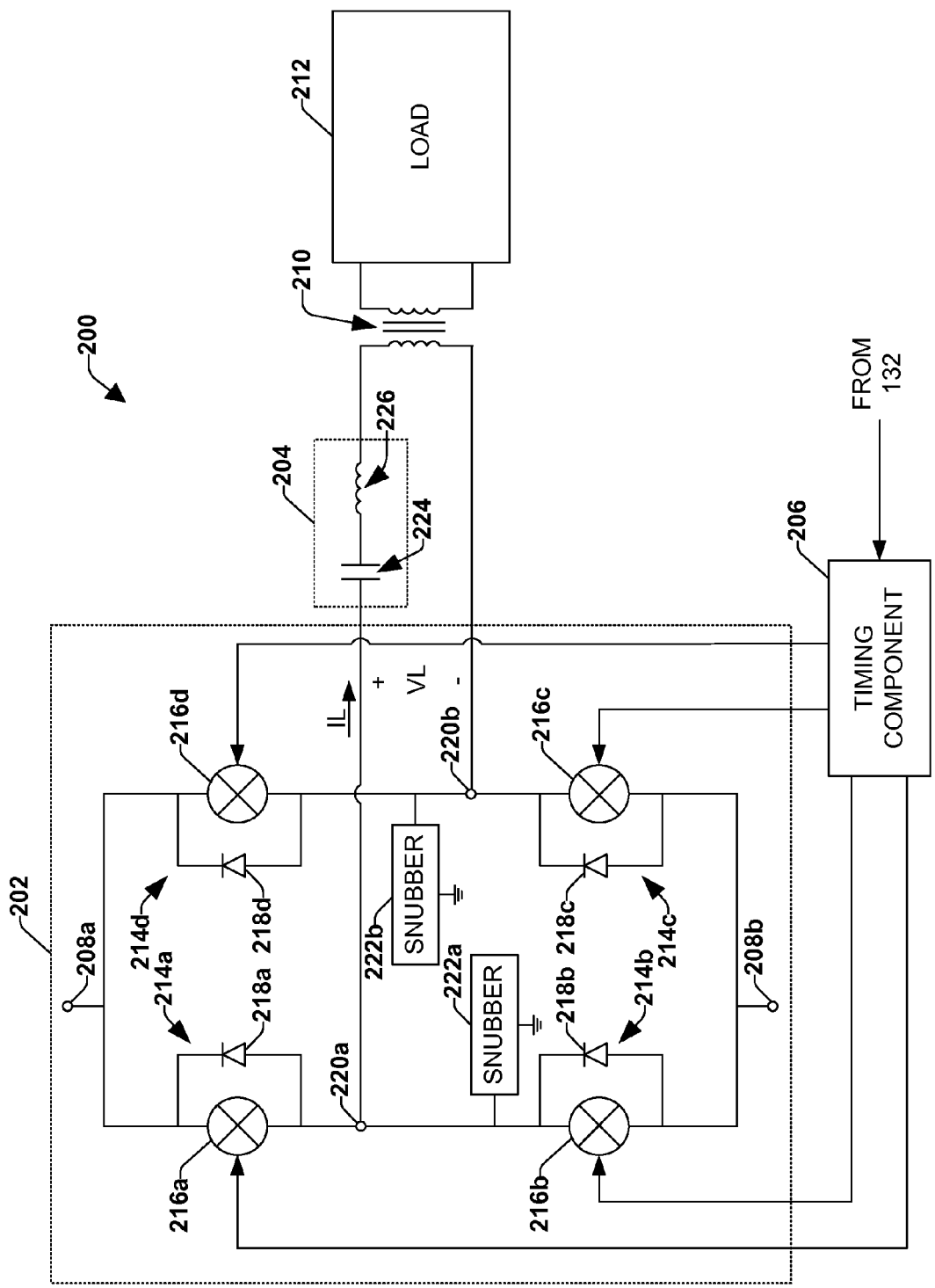
FIG. 2 is a diagram illustrating an example power converter, such as resonant converter.

FIG. 2 illustrates a layout of an example power converter 200 (e.g., 136 in FIG. 1) having a resonant topology, and thus referred to as a resonant converter. In one embodiment, the example power converter 200 is configured to output at least 2 kW of power (e.g., but values less than 2 kW are also contemplated). In another embodiment, the power converter 200 is configured to output a minimum dynamic power range of 7 to 1. That is, stated differently, the power converter 200 is designed to operate at range of loads, where the maximum load is at least seven times greater than the minimum load. Ratios greater than 7 to 1, such as 10 to 1, 100 to 1, etc. and/or ratios less than 7 to 1, such as 4 to 1, 2 to 1, etc. are also contemplated. By way of example, in one embodiment, the power converter 200 is configured to have a minimum dynamic power range of 25 to 1 and a maximum power output of at least 20 kW.

The power converter 200 comprises a bridge 202, a resonant circuit 204, and a timing component 206. In the illustrated embodiment, the power converter 200 is configured to invert a signal received at one or more of the input terminals 208a-b to transform DC power into AC power for output to a load 212 (e.g., such as to the radiation source 116 or detector array 118 of FIG. 1 or such as to a rectifier positioned on the rotating gantry 106 of the examination unit 102 of FIG. 1). In the example embodiment, the power converter 200 is operably coupled to the load 212 via a transformer 210. For example, in a radiation system, the power converter 200 may be positioned on a support structure (e.g., 108 in FIG. 1) and a first winding of the transformer 210 may be positioned within the support structure proximate a rotating gantry (e.g., 106 in FIG. 1). A second winding of the transformer 210 may be positioned within the rotating gantry proximate the support structure. In this way, via the transformer 210, a current can be induced within a rotating gantry to transfer power from the support structure to the rotating gantry, for example.

It is to be appreciated that while specific reference is made to a resonant converter configured to invert power from DC to AC, in other embodiments, the resonant converter may be configured to rectify power and/or alter a voltage associated with a power signal.

The bridge 202 comprises a plurality of gates 214a-d arranged in an H-bridge configuration, such that a first gate 214a and a third gate 214c are arranged on a diagonal and a second gate 214b and a fourth gate 214d are arranged on a diagonal. As used herein, a pair of gates may be intended to refer to two or more diagonally arranged gates through which current flows to generate a voltage applied the load 212. For example, the first gate 214a and the third gate 214c may be referred to as a first pair due to diagonal arrangement of the first gate 214a and the third gate 214c. Similarly, the second gate 214b and the fourth gate 214d may be referred to as a second pair due to the diagonal arrangement of the second gate 214b and the fourth gate 214d.

It is to be appreciated that the bridge arrangement described herein is merely an example arrangement and is not intended to limit the scope of the disclosure, including the scope of the claims. For example, in another embodiment, the bridge 202 may comprise an addition leg (e.g., series arrangement) of one or more gates to provide for generating three-phase power. In another embodiment, the bridge may have a Half-H arrangement, for example.

Respective gates 214a-d comprise a switching element 216a-d and a diode 218a-d arranged in parallel. The switching elements 216a-d are respectively configured to switch between a first position, such as an on-position, and a second position, such as an off-position, based upon timing signals received by the timing component 206 of the power converter 200. The diodes 218a-d, which may be reverse biased, are configured to reduce or mitigate the possibility of a load voltage(s) exceeding a voltage supplied to the bridge via the input terminals 208a-b.

The switching elements 216a-d may respectively comprise one or more suitable electronic switches, such as insulated gate bipolar transistors (IGBTs), bipolar junction transistors (BJTs), field-effect transistors (FETs), metal-oxide semiconductor field-effect transistors (MOSFETs), gate turnoff thyristors (GTOs), integrated gate-commutated thyristors (IGCTs), bidirectional triode thyristors (TRIACs), etc., for example. A pair of switching elements may be used herein to refer to two or more diagonally positioned switching elements through which current flows to apply a voltage to the load 212. For example, a first switching element 216a of the first gate 214a and a third switching element 216c of the third gate 214c may be referred to as a first pair due to the diagonal arrangement of the first switching 216a and the third switching element 216c. Accordingly, a first voltage may be applied to the load when both the first switching element 216a and the third switching element 216c are turned to an on-position. Similarly, the second switching element 216b of the second gate 214b and the fourth switching element 216d of the fourth gate 214d may be referred to as a second pair due to the diagonal arrangement of the second switching element 216b and the fourth switching element 216d. Accordingly, a second voltage may be applied to the load when both the second switching element 216b and the fourth switching element 216d are turned to an on-position.

A first input terminal 208a of the bridge 202 is coupled between the first gate 214a and the fourth gate 214d and a second input terminal 208b of the bridge 202 is coupled between the second gate 214b and the third gate 214c. In one embodiment, the first input terminal 208a is further coupled to a power supply (e.g., 134 in FIG. 1) and the second input terminal 208b is connected to ground. In another embodiment, the first input terminal 208a and the second input terminal 208b are connected to a power supply.

A first output terminal 220a of the bridge 202 is coupled between the first gate 214a and the second gate 214b, and in one embodiment, a first snubber 222a is further coupled between the first gate 214a and the second gate 214b. A second output terminal 220b of the bridge 202 is coupled between the third gate 214c and the fourth gate 214d, and in one embodiment, a second snubber 222b is further coupled between the third gate 214c and the fourth gate 214d. In some embodiments, the first snubber 222a and/or the second snubber 222b are configured to limit a voltage slew rate and/or lower switch power when a switching element 2161a-d is turning off, for example.

An input voltage ($+V_{Bridge}$) is applied to the bridge 202 via the input terminals 208, and the timing component 206 is configured to activate (e.g., turn-on) respective gates 216a-b to generate an output voltage (VL) (e.g., also referred to as a load voltage), which causes a load current (IL) to flow through the resonant circuit 204 and the first winding of the transformer 210 (e.g., where the first windowing of the transformer 210 may be part of the resonant circuit 204 and/or distinct from the resonant circuit 204. In one embodiment, the voltage applied to the bridge is at least 400 VDC. In other embodiments, the voltage applied to the bridge may be greater than or less than 400 VDC.

In the illustrated embodiment, the resonant circuit 204 (e.g., including the transformer 210) comprises a series resonant topology having a capacitor 224 that is coupled in series with an inductor 226. The capacitor 224 is also coupled to the first output terminal 220a of the bridge 202. The inductor 226 is coupled in series with the capacitor 224 and is coupled to a first winding of the transformer 210. The first winding of the transformer 210 is also coupled to the second output terminal 220b of the bridge 202.

It is to be appreciated that the resonant circuit 204 (e.g., including the transformer 210) arrangement described herein is merely as example arrangement and is not intended to limit the scope of the disclosure, including the scope of the claims. For example, in another embodiment, the resonant circuit has a parallel resonant topology. In still another embodiment, the resonant circuit may have a series resonant circuit topology that differs from the one illustrated in FIG. 2.

The timing component 206 is coupled to respective switches 216a-d and is configured to generate timing signals which cause respective switches 216a-d to switch between a first position (e.g., an on-position) and a second position (e.g., an off-position) based upon a timing schedule. The timing component 206 is also coupled to an input component, such as the controller 132 in FIG. 1, configured to provide information regarding control parameters for the bridge 202 and/or information describing desired properties of the signal output from the bridge 202. Example control parameters that may be input to the timing component 206 include, among other things, a desired drive period (e.g., frequency), a desired phase delay for switching one or more of the switching elements 216a-d, and/or a desired dead time between two or more switching elements 216a-d, for example.

In one embodiment, the timing component 206 is configured to devise the timing schedule and/or revise an existing timing schedule (e.g., modifying a first timing schedule to generate a second timing schedule) as a function of a known impulse response of the power converter or resonant converter for the one or more specified control parameters received from the input component. An impulse response describes a reaction of the power converter 200 in response to a given control parameter(s), and in one embodiment, is derived from measurements acquired during a calibration or testing phase of the power converter 200 or a similarly arranged power converter. For example, during a calibration phase, the impulse response of the power converter 200 may be measured at various operating conditions (e.g., as specified via the control parameters). Based upon these measurements, a table or other reference tool, for example, may be devised that describes how the impulse response of the power converter 200 is expected to change for a given change to one or more control parameters.

During a non-calibration phase, the timing component 206 may utilize the table or other reference tool describing impulse responses to devise a timing schedule for switching one or more of the switching elements 216a-d based upon one or more specified control parameters (e.g., drive period, phase delay, dead time, etc.). By way of example, the timing component 206 may look-up an impulse response of the power converter 200 from the table for a given set of control parameters. Where one or more specified control parameters do not precisely match values comprised in the table, the timing component 206 may use estimation techniques (e.g., interpolation, extrapolation, etc.) to approximate the impulse response of the power converter 200 given one or more known impulse responses in the table, for example.

Further, the timing schedule may be revised (e.g., modifying a first timing schedule to generate a second timing schedule) as a function of a change to one or more of the control parameters. In this way, the timing schedule and thus timing signals, are dynamically changed as a function of a change to at least one control parameter. By way of example, as a result of a change in at least one of the control parameters, the timing component 206 may adjust the timing schedule (e.g., from a first timing schedule specifying the timing of switching elements 216a-d to a second timing schedule specifying the timing of switching elements 216a-d) to modify the phase width of a timing signal supplied to at least one switching element 216a-d and/or to modify a dead-time between respective switching elements of a pair of switching elements, for example. In another embodiment, the timing component 206 may revise the timing schedule to adjust a flyback pause (e.g., where the first timing schedule provides for a first flyback pause and the second (e.g., adjusted) timing schedule provides for a second flyback pause that is different than the first flyback pause), for example.

Figure 4:
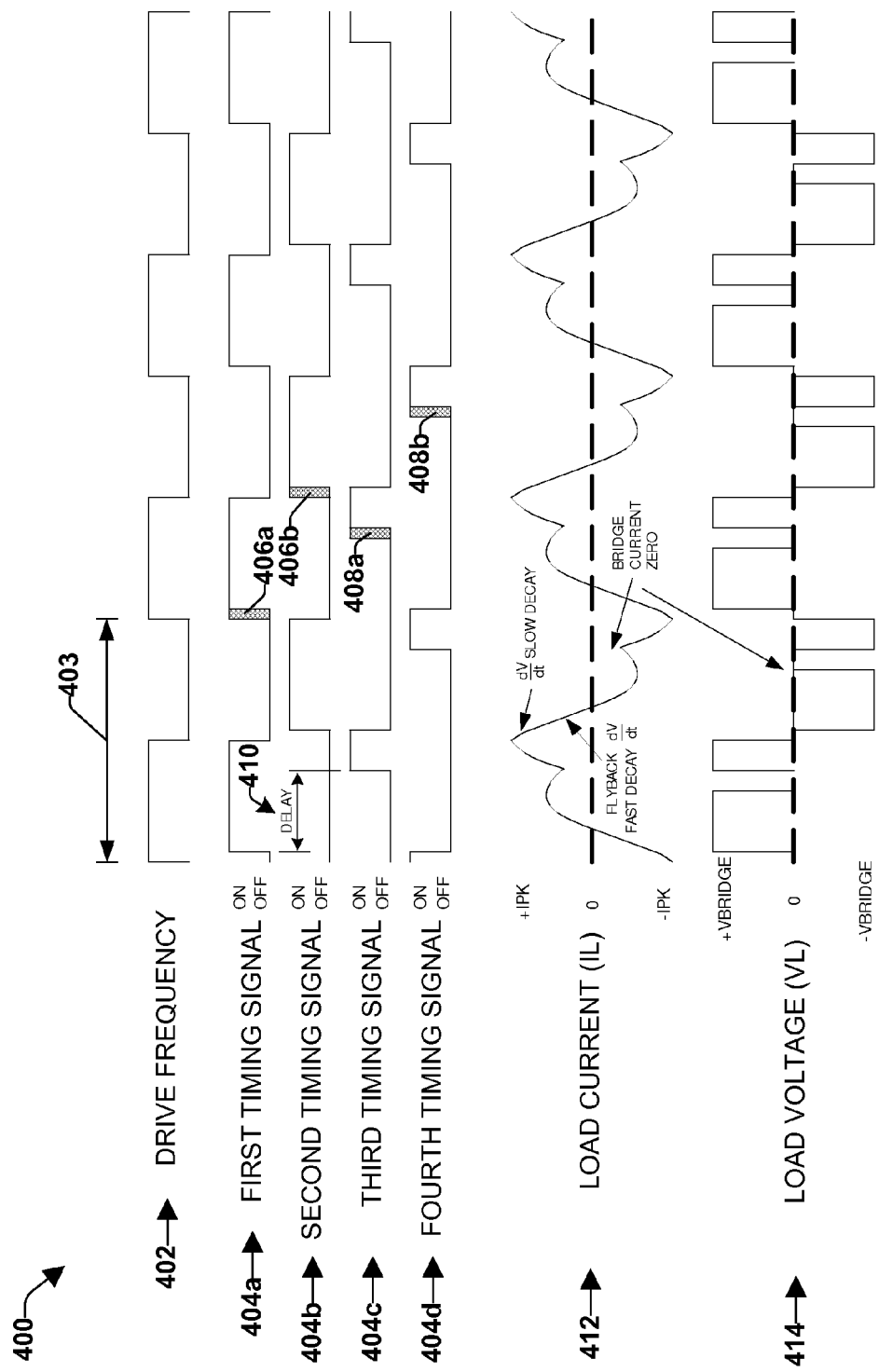
FIG. 4 illustrates an example timing diagram for a power converter, such as a resonant converter.

As may be further described with respect to FIG. 4, which illustrates an example timing diagram for a power converter, such as the power converter 200 illustrated in FIG. 2, the timing schedule that is devised as a function of a known impulse response may have particular properties. For example, in some embodiments, the timing schedule provides for supplying a first timing signal to the first switching element 216a that has a different pulse width than a second timing signal supplied to another switching element, such as the third switching element 216c. In some examples, the timing signals generated for respective switching elements of a pair of switching elements, such as the first switching element 216a and the third switching element 216c, differ in pulse width.

As another example, the timing schedule may provide for setting a timing signal for controlling one switching element of one gate such that a current through a diode of another gate, such as a paired gate, is substantially zero before the one switching element is turned to an on-position. By way of example, the timing schedule may provide for setting a third timing signal for controlling the third switching element 216c of the third gate 214c such that a current through the first diode 218a of the first gate 214a (e.g., to which the third gate 214c is paired) is substantially zero before the third switching element 216c is turned to an on-position. As another example, the timing schedule may provide for setting a fourth timing signal for controlling the fourth switching element 216d of the fourth gate 214d such that a current through the second diode 218b of the second gate 214b (e.g., to which the fourth gate 214d is paired) is substantially zero before the fourth switching element 216d is turned to an on-position. In still another embodiment, the timing schedule may provide for setting a pulse shape of the third timing signal and a pulse shape of the fourth timing signal such that both a current through the first diode 218a and a current through the second diode 218b are substantially zero before either of the third switching element 216c and the fourth switching element 216d are turned to an on-position.

While FIG. 2 describes devising a timing schedule as a function of a known impulse response of the power converter 200 (e.g., and is thus a feed-forward system), in another embodiment, the impulse response may be measured and the timing schedule may be devised, or revised, based upon the measurements (e.g., such that the timing schedule is updated as a function of (e.g., evolving, changing, etc.) conditions/properties of the power converter 200). In this way, a feedback loop is created that provides for adjusting the timing signals between a first switching cycle and a second switching cycle as a function of what is occurring within the power converter 200 (e.g., as opposed to merely providing a prediction regarding what is expected to occur).

Figure 3:
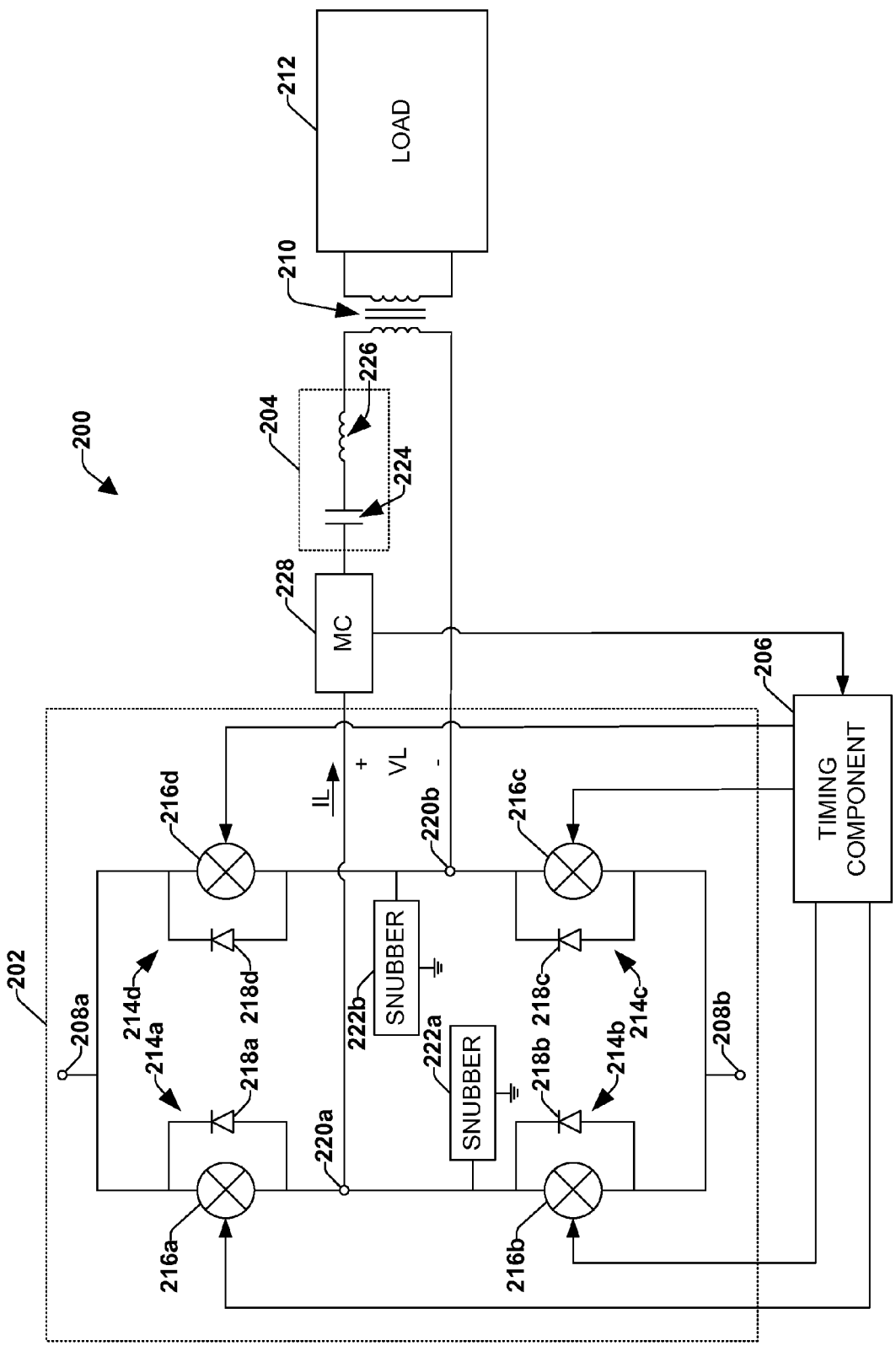
FIG. 3 is a diagram illustrating an example power converter, such as a resonant converter.

FIG. 3 illustrates an example layout of an example power converter 200 (e.g., 136 in FIG. 1) that provides for measuring an impulse response and adjusting a timing component as a function of the measurement(s). In the example arrangement, the power converter 200 comprises a bridge 202, a resonant circuit 204, a timing component 206, and a measurement component 228 arranged in a resonant topology. It is to be appreciated that features described with respect to FIG. 2 may find applicability to the power converter described with respect to FIG. 3 even though the features are not further described with respect to FIG. 3 for purposes of brevity.

In the illustrated embodiment, the measurement component 228 is coupled between a first output terminal 220a of the bridge 202 and the resonant circuit 204 and is configured to measure the current through the power converter 200 or current output by the bridge 202 (e.g., IL). It is to be appreciated that the illustrated arrangement is merely provided as an example and that in other embodiments, the measurement component 228 may be located elsewhere within the power converter 200.

The measurement component 228 is also coupled to the timing component 206 and is configured to provide information pertaining to the measured current to the timing component 206. Accordingly, the measurement component 228 provides the timing component 206 with information regarding an actual impulse response of the power converter 200 (e.g., or regarding an aspect of the actual impulse response related to current). That is, stated differently, the measurement component 228 provides the timing component 206 with feedback regarding how the power converter 200 is responding given the present timing schedule (e.g., or a first timing schedule). Based upon this feedback, the timing component 206 may revise the timing schedule to generate a second timing schedule that alters one or more properties of at least one timing signal in order to adjust the current through the power converter 200. Such adjustments may be repeated during successive switching cycles until a desired current through the power converter 200 is achieved and/or until other stopping criteria has been met (e.g., such as a specified number of iterations), for example. By way of example, in one embodiment, the timing component 206 is configured to modify a pulse width of at least one timing signal provided for by the revised timing schedule (e.g., the second timing schedule) relative to a first timing signal or initial timing signal based upon the feedback provided by the measurement component 228.

It is to be appreciated that while the measurement component 228 is described as measuring the current through the power converter 200, in another embodiment, the measurement component 228 is configured to measure a voltage (VL) applied to the load 212 and/or applied to the resonant circuit 204. Moreover, in still another embodiment, the measurement component 228 is configured to measure both the current through the power converter 200 and the voltage applied to the load 212 and/or applied to the resonant circuit 204. Accordingly, the information transmitted to the timing component 206 may be indicative of a current measurement(s), voltage measurement(s), and/or both. Moreover, the circuitry of the measurement component 228 may be a function of whether the measurement component 228 is configured to measure current, voltage, and/or both.

Further, it may be appreciated that features described with respect to FIG. 2 may be combined with features described with respect to FIG. 3. By way of example, the timing component 206 illustrated in FIG. 3 may be further configured to receive control parameters, such as from a controller (e.g., 132 in FIG. 1) and/or configured to generate the timing schedule as a function of a known impulse response for one or more control parameters. By way of example, an initial timing schedule may be devised for a given set of parameters based upon known impulse responses of the power converter 200. Subsequently, the timing schedule may be revised after one or more switching cycles based upon measurements captured by the measurement component 228 to devise a second timing schedule, third timing schedule, etc. Moreover, when a change to one or more of the control parameters is requested to yield an updated set of control parameters, a new timing schedule may be devised based upon a known impulse response for the updated set of control parameters. This new timing schedule may be subsequently revised based upon measurements captured by the measurement component 228, for example. Accordingly, the timing component 206 may use both feedback from the power converter 200 and tables or other references generated from calibrations/testing to devise one or more timing schedules.

FIG. 4 illustrates an example timing diagram 400 such as may be devised using the techniques and/or systems described herein for generating timing signals 404a-d for respective switching elements. By way of example, a first timing signal 404a may be utilized to control whether a first switching element (e.g., 216a in FIGS. 2 and 3) is turned to an on-position or an off-position, a second timing signal 404b may be utilized to control whether a second switching element (e.g., 216b in FIGS. 2 and 3) is turned to an on-position or an off-position, etc.

The timing diagram 400 illustrates a drive signal 402 configured to drive a timing component (e.g., 206 in FIGS. 2 and 3). The drive signal 402 describes the timing of a switching cycle. The switching cycle defines a period 403, with half of the period 403 being spent above a predetermined value and half of the period 403 being spent below the predetermined frequency.

In the illustrated embodiment, a first switching element (e.g., 216a in FIGS. 2 and 3), to which the first timing signal 404a is transmitted by the timing component, and a second switching element (e.g., 216b in FIGS. 2 and 3), to which the second timing signal 404b is transmitted, are coupled in parallel and are driven as a first complementary pair with dead time 406a-b (e.g., a time in which both switching elements of the first complementary pair are turned off to mitigate a current surge). A third switching element (e.g., 216c in FIGS. 2 and 3), to which the third timing signal 404c is transmitted, and a fourth switching element (e.g., 216d in FIGS. 2 and 3), to which the fourth timing signal 404d is transmitted, are coupled in parallel and are driven as a second complementary pair with dead time 408a-b (e.g., a time in which both switching elements of the second complementary pair are turned off to mitigate a current surge).

A phase delay 410 is introduced relative to the first complementary pair and the second complementary pair. The phase delay describes a delay in a switching cycle between when any switching element of the first complementary pair switches to an on-position (e.g., which in the illustrated embodiment is the first switching element) and when any switching element of the second complementary pair switches to an on-position (e.g., which in the illustrated embodiment is the third switching element).

In the illustrated embodiment, the first timing signal 404a facilitates switching the first switching element to an on-position temporally proximate to a start time of the switching cycle (e.g., although there is a slight delay between when the switching cycle begins and when the first timing signal 404a initiates switching the first switching element to an on-position). The first switching element remains on for approximately a first half of the switching cycle, and approximately half way through the cycle, the first switching element is switched to an off-position (e.g., and remains off for the duration of the switching cycle). The second switching element, controlled by the second timing signal 404b, switches to an on-position slightly after the half-way point of the switching cycle and remains in an on-position through the duration of the switching cycle.

The third switching element, controlled by the third timing signal 404c, is configured to switch to an on-position a specified amount of time after the first switching element is switched to an on-position. The specified amount of time is referred to as the phase delay 410. Accordingly, the third switching element is delayed in switching to the on-position in accordance with the specified phase delay 410. The third switching element remains in the on-position until the second switching element is switched to the on-position and remains in an off position for the remainder of the switching cycle.

The fourth switching element, controlled by the fourth timing signal 404d, is configured to switch to an on-position a specified amount of time after the second switching element is switched to an on-position. In one embodiment, the amount of delay is equal to the amount of delay experienced by the third switching element. Accordingly, the fourth switching element is delayed in switching to the on-position in accordance with the specified phase delay 410 relative to when the second switching element is switching on. The fourth switching element remains in the on-position until the first switching element is switched to the on-position. Accordingly, the fourth switching element remains in the on-position for the remainder of the switching cycle (e.g., and into the next switching cycle).

The timing diagram 400 also illustrates a load current 412 (e.g., IL) generated by the power converter according to the foregoing timing schedule. As illustrated, the load current 412 is at a minimum value at the beginning of the switching cycle and increases in value until a short time before the third switching signal switches to an on-position. For a brief interval prior to the third switching element switching to an on-position, the load current 412 begins to drop. Upon the third switching element switching to an on-position, the load current 412 again begins to increase until the first switching element is turned to an off-position. During the interval in which the second switching element and the third switching element are respectively switched to an on-position, the load current 412 experiences a slow decay period (dV/dt). When the third switching element is switched to an off-position, the load current begins to experience flyback and/or experiences a fast decay period (dV/dt). The load current 412 steadily drops until slightly before the fourth switching element switches to an on-position, when the load current 412 begins to again increase. Subsequently, when the bridge current reaches zero and the fourth signal is turned on, the load current 412 resumes decreasing until the beginning of the next switching cycle.

The timing diagram 400 also illustrates the load voltage 414 (e.g., VL) generated by the power converter according to the foregoing timing schedule. Initially, upon the first switch being turned on, the load voltage 414 is approximately equal to $+V_{Bridge}$ (e.g., even though a corresponding bridge is not in an on cycle where a pair of switching elements, such as the first switching element and the third switching element are both in an on-position or the second switching element and the fourth switching element are both in an on-position) due to the current from a previous cycle not having decayed to zero. At some point prior to the third switching element turning on, the current from the previous cycle decays to zero and the voltage drops to approximately zero. When the third switching element is turned on, causing the first switching element and the third switching element to be turned on concurrently, the voltage increases again to approximately $+V_{Bridge}$. When the first switching element switches to an off-position, the voltage again drops to zero and remains at zero until the third switching element is switched to an off-position. When the third switching element switches to an off-position, the voltage output by the power converter decreases to approximately $-V_{Bridge}$ due to current not having decayed to zero. At some point prior to the fourth switching element turning on, the current decays to zero and the voltage increases to approximately zero. When the fourth switching element is turned on, causing the second switching element and the fourth switching element to be turned on concurrently, the voltage decreases again to approximately $-V_{Bridge}$. The voltage remains at $-V_{Bridge}$ until the second switching element is switched to an off-position.

It is to be appreciated that by controlling the pulse shape of the timing signals, such as the phase delay, the length of time during which the load current is experiencing slow decay and/or the length of time during which the load current is experiencing fast decay can be modified so that a reverse diode current in the bridge reaches substantially zero before the third switching element and/or the fourth switching element are turned on. In another embodiment, the timing component is configured to adjust a flyback pause of a pulse to provide for a reverse diode current in the bridge reaching substantially zero before the third switching element and/or the fourth switching element are turned on, for example.

Figure 5:
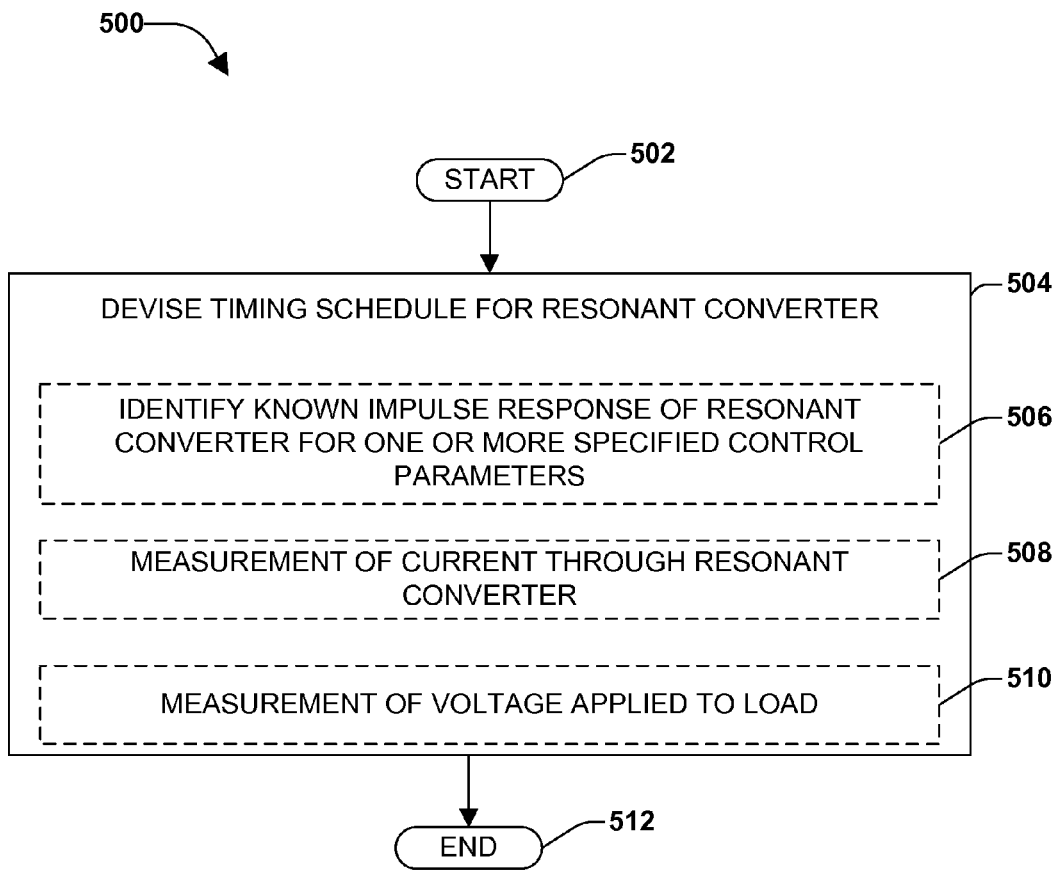
FIG. 5 is a flow chart diagram of an example method for power conversion.

FIG. 5 illustrates an example method 500 for power conversion. The example method 500 begins at 502 and a timing schedule is devised for a power converter, such as a resonant converter at 504. The timing schedule provides information utilized for switching one or more switching elements of the power converter and may be modified over time.

The timing schedule is devised as a function of at least one of a known impulse response for the power converter, a measurement of current (e.g., referred to as a current measurement) through the resonant converter, and/or a measurement of voltage (e.g., referred to as a voltage measurement) applied to a load to which the power converter or bridge component thereof is coupled. By way of example, in one embodiment, devising the timing schedule comprises identifying a known impulse response of the power converter for one or more specified control parameters at 506. That is, stated differently, a response of the power converter that is expected to occur given a set of one or more control parameters is identified. In one embodiment, such identification may occur using a calibration table or other reference tool describing the responses of the power converter or a similarly structured power converter during calibration tests or other testing. It may be appreciated that where the response of the power converter for the specified set of one or more control parameters was not previously measured, estimation techniques may be utilized to estimate the impulse response from the calibration table or other reference tool.

As another example, devising the timing schedule comprises measuring the current through the power converter and devising a timing schedule based upon the current measurement at 508. That is, stated differently, a first timing schedule may be devised, such as based upon a set of one or more specified control parameters and/or a known impulse response for the set of specified control parameters. Accordingly, during at least one switching cycle of the power converter, the timing signals may be generated based upon the first timing schedule. Moreover, during at least some of the at least one switching cycle, the current though the power converter may be measured. As a function of the measurement(s) of current through the power converter, the first timing schedule may be revised to generate a second timing schedule (e.g., to update the timing schedule as a function of actual conditions of the power converter). As yet another example, devising the timing schedule comprises measuring the voltage applied to a load to which the power converter is coupled and devising a timing schedule based upon the voltage measurement at 510. Further, in yet another embodiment, the timing schedule is devised as a function of a combination of at least two of identifying a known impulse response for the one or more specified control parameters at 506, measuring the current through the power converter at 508, and/or measuring a voltage applied to the load at 510.

In one embodiment, the timing schedule devised at 504 provides for supplying a first timing signal to a first switching element (e.g., to control whether the first switching element is turned on or turned off) that has a different pulse width than a third timing signal transmitted to a third switching element. Accordingly, the amount of time that the first switching element is turned on may differ from an amount of time that the third switching element is turned on, for example. Moreover, in one embodiment, the first switching element and the third switching element are paired such as a voltage is applied to the load when both the first switching element and the third switching element are turned to an on-position (e.g., because the on-position of the first and third switching elements allows current to flow in a manner that provides for generating a voltage that is applied the load).

In another embodiment, the timing schedule devised at 504 provides for setting a pulse shape of a third timing signal supplied to a third switching element and/or setting a pulse shape of a fourth timing signal supplied to a fourth switching element such that a current through a first diode of a first switching element to which the third switching element is paired (e.g., to allow current to flow in a manner that provides for generating a voltage that is applied the load) and/or a current through a second diode of a second switching element to which the fourth switching element is paired are substantially zero before the third switching element is turned to an on-position and/or before the fourth switching element is turned to an on-position.

It is to be appreciated that where devising the timing schedule at 504 comprises revising an existing time schedule (e.g., such as may occur if a control parameter changes, and the timing schedule is revised as a function of current/voltage through the power converter), the revised timing schedule may cause the properties of one or more timing signals to change relative to the properties of such timing signals when generated according to the existing timing schedule. By way of example, the revised timing schedule (e.g., a second timing schedule) may provide for modifying a pulse width of the timing signal output to at least one of the one or more switching elements of the power converter relative to the pulse width of the timing signal as provided for by the existing timing schedule (e.g., a first timing schedule). As another example, the revised timing schedule may provide for altering a flyback pause (e.g., such that the second timing schedule provides for a flyback pause that is different than a first flyback pause as provided for in the first timing schedule).

The example method 500 ends at 512.

Figure 6:
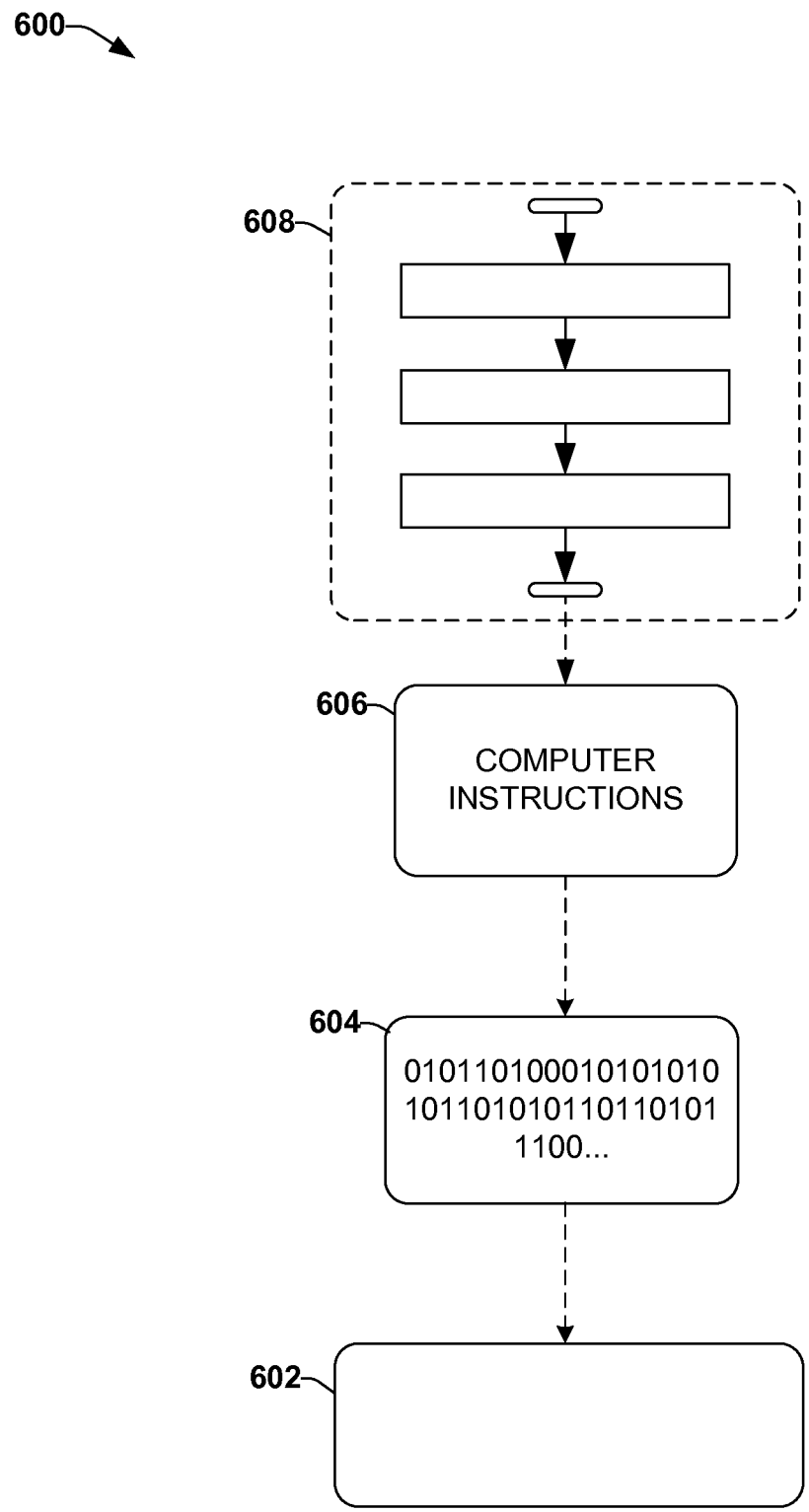
FIG. 6 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 6, wherein the implementation 600 comprises a computer-readable medium 602 (e.g., a flash drive, CD-R, DVD-R, application-specific integrated circuit (ASIC), field-programmable gate array (FPGA), a platter of a hard disk drive, etc.), on which is encoded computer-readable data 604. This computer-readable data 604 in turn comprises a set of computer instructions 606 configured to operate according to one or more of the principles set forth herein. In one such embodiment 600, the processor-executable instructions 606 may be configured to perform a method 608, such as at least some of the example method 500 of FIG. 5, for example. In another such embodiment, the processor-executable instructions 606 may be configured to implement a system, such as at least some of the exemplary environment 100 of FIG. 1 and/or at least some of the exemplary power converter 200 of FIG. 2 and/or FIG. 3, for example. Many such computer-readable media may be devised by those of ordinary skill in the art that are configured to operate in accordance with one or more of the techniques presented herein.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Further, unless specified otherwise, "first," "second," and/or the like are not intended to imply a temporal aspect, a spatial aspect, an ordering, etc. Rather, such terms are merely used as identifiers, names, etc. for features, elements, items, etc. (e.g., "a first channel and a second channel" generally corresponds to "channel A and channel B," where channel A and channel B may be two different channels, two identical channels, and/or the same channel).

Although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. Similarly, illustrated ordering(s) of acts is not meant to be limiting, such that different orderings comprising the same of different (e.g., numbers) of acts are intended to fall within the scope of the instant disclosure. In addition, while a particular feature of the disclosure may have been disclosed with respect to only one of several implementations, such feature may be combined with one or more other features of the other implementations as may be desired and advantageous for any given or particular application.

What is claimed is:

1. A resonant converter, comprising:
a plurality of switching elements, comprising:
a first switching element coupled in parallel to a first diode; and
a third switching element coupled in parallel to a third diode, wherein the first switching element and the third switching element define a first pair of switching elements; and
a timing component configured to generate a timing signal for respective switching elements of the plurality of switching elements based upon a timing schedule, wherein:
the timing schedule provides for setting a third timing signal for controlling the third switching element such that a current through the first diode is substantially zero before the third switching element is turned to an on-position,
the timing schedule is devised as a function of at least one of:
a known impulse response of the resonant converter for one or more specified control parameters;
a current measurement of current through the resonant converter; or
a voltage measurement of voltage applied to a load to which the resonant converter is coupled, and
a first voltage is applied to the load when the first pair of switching elements is turned to an on-position.

2. The resonant converter of claim 1, the one or more specified control parameters comprising at least one of a desired drive period, a desired phase delay for switching at least one switching element, or a desired dead time between two switching elements of the plurality of switching elements.

3. The resonant converter of claim 1, a first timing signal supplied to the first switching element having a different pulse width than the third timing signal supplied to the third switching element.

4. The resonant converter of claim 1, the timing schedule devised as a function of the voltage measurement of voltage applied to a load to which the resonant converter is coupled.

5. The resonant converter of claim 1, the timing schedule devised as a function of the current measurement of current through the resonant converter.

6. The resonant converter of claim 1, the plurality of switching elements comprising:
a second switching element coupled in parallel to a second diode; and
a fourth switching element coupled in parallel to a fourth diode, wherein:
the second switching element and the fourth switching element define a second pair of switching elements,
a second voltage is applied to the load when the second pair of switching elements is turned to an on-position, and
the timing schedule provides for setting a fourth timing signal for controlling the fourth switching element such that a current through the second diode is substantially zero before the fourth switching element is turned to an on-position.

7. The resonant converter of claim 6, wherein the timing schedule provides for setting a pulse shape of the third timing signal and setting a pulse shape of the fourth timing signal such that the current through the first diode and the current through the second diode are substantially zero before the third switching element is turned to an on-position and before the fourth switching element is turned to an on-position.

8. The resonant converter of claim 7, the timing component configured to modify a first timing schedule to generate a second timing schedule as a function of at least one of:
the current measurement of current through the resonant converter; or
the voltage measurement of voltage applied to a load to which the resonant converter is coupled.

9. The resonant converter of claim 8, the timing component configured to modify a pulse width of at least one timing signal provided for by the second timing schedule relative to the first timing schedule.

10. The resonant converter of claim 8, wherein the second timing schedule provides for a second flyback pause that is different than a first flyback pause as provided for in the first timing schedule.

11. The resonant converter of claim 1, wherein the resonant converter is configured to output at least 2 kW of power.

12. The resonant converter of claim 1, wherein the resonant converter is configured to apply a voltage of at least 400 VDC to a bridge of the resonant converter comprising the plurality of switching elements.

13. The resonant converter of claim 1, wherein the resonant converter is configured to output power at a minimum dynamic power range of 7 to 1.

14. The resonant converter of claim 1, the timing schedule devised as a function of the known impulse response of the resonant converter for the one or more specified control parameters.

15. A method for power conversion, comprising:
devising a timing schedule for a resonant converter, wherein:
the timing schedule provides information utilized for switching a plurality of switching elements of the resonant converter,
the devising comprising devising the timing schedule as a function of at least one of:
a known impulse response of the resonant converter for one or more specified control parameters;
a current measurement of current through the resonant converter; or a voltage measurement of voltage applied to a load to which the resonant converter is coupled, and the timing schedule provides for setting a pulse shape of a third timing signal supplied to a third switching element of the plurality of switching elements and setting a pulse shape of a fourth timing signal supplied to a fourth switching element of the plurality of switching elements such that a current through a first diode of a first switching element of the plurality of switching elements to which the third switching element is paired and a current through a second diode of a second switching element of the plurality of switching elements to which the fourth switching element is paired are substantially zero before the third switching element is turned to an on-position and before the fourth switching element is turned to an on-position.

16. The method of claim 15, the one or more specified control parameters comprising at least one of a desired drive period, a desired phase delay for switching at least one switching element, or a desired dead time between two switching elements of the plurality of switching elements.

17. The method of claim 15, wherein the timing schedule provides for supplying a first timing signal to the first switching element and for supplying the third timing signal to the third switching element, the first timing signal having a different pulse width than the third timing signal.

18. The method of claim 17, comprising applying a voltage to the load when both the first switching element and the third switching element are turned to an on-position.

19. The method of claim 15, the devising comprising devising the timing schedule as a function of the voltage measurement of voltage applied to the load to which the resonant converter is coupled.

20. The method of claim 15, the devising comprising revising the timing schedule to generate a second timing schedule, the second timing schedule providing for modifying a pulse width of a timing signal output to at least one of the plurality of switching elements relative to a pulse width of a timing signal as provided for by the timing schedule.

21. The method of claim 15, the devising comprising devising the timing schedule as a function of the known impulse response of the resonant converter for the one or more specified control parameters.

22. The method of claim 15, the devising comprising devising the timing schedule as a function of the current measurement of current through the resonant converter.

23. A resonant converter for a radiation system having a minimum dynamic power range of 25 to 1 and a maximum power output of at least 20 kW, comprising:

a plurality of switching elements, comprising:
a first switching element coupled in parallel to a first diode; and
a third switching element coupled in parallel to a third diode, wherein the first switching element and the third switching element define a first pair of switching elements; and a timing component configured to generate a timing signal for respective switching elements of the plurality of switching elements based upon a timing schedule, wherein:
the timing schedule provides for setting a third timing signal for controlling the third switching element such that a current through the first diode is substantially zero before the third switching element is turned to an on-position,
the timing schedule is devised as a function of at least one of:
a known impulse response of the resonant converter for one or more specified control parameters;
a current measurement of current through the resonant converter; or
a voltage measurement of voltage applied to a load to which the resonant converter is coupled,
a first voltage is applied to the load when the first pair of switching elements is turned to an on-position, and
the resonant converter operably is coupled to the radiation system and configured to provide power to at least one of a radiation source or a detector array of the radiation system.

24. The resonant converter of claim 23, the timing schedule devised as a function of the current measurement of current through the resonant converter.

25. The resonant converter of claim 23, the timing schedule devised as a function of the voltage measurement of voltage applied to the load to which the resonant converter is coupled.

26. The resonant converter of claim 23, the timing schedule devised as a function of the known impulse response of the resonant converter for the one or more specified control parameters.

* * * * *